US008797911B2

(12) United States Patent
He et al.

(10) Patent No.: US 8,797,911 B2
(45) Date of Patent: Aug. 5, 2014

(54) METHOD AND APPARATUS FOR REDUCING POWER CONSUMPTION IN A WIRELESS COMMUNICATION DEVICE (75) Inventors: Linhai He, San Diego, CA (US); Rashid A. Attar, San Diego, CA (US); Christopher G. Lott, San Diego, CA (US); Donna Ghosh, San Diego, CA (US); Chaitanya Mannemala, San Jose, CA (US); Sunit Bhatia, Fremont, CA (US); Sudheer Konda, San Diego, CA (US); Gopal Chillariga, Campbell, CA (US)

(73) Assignee: Qualcomm Incorporated, San Diego, CA (US)

( * ) Notice: Subject to any disclaimer, the term of this patent is extended or adjusted under 35 U.S.C. 154(b) by 166 days.

(21) Appl. No.: 13/401,143

(22) Filed: Feb. 21, 2012

(65) Prior Publication Data
US 2013/0215788 A1 Aug. 22, 2013

(51) Int. Cl.
H04W 52/02 (2009.01)
H04W 24/00 (2009.01)

(52) U.S. Cl.
CPC ...... *H04W 52/0232* (2013.01); *H04W 52/0258* (2013.01); *Y02B 60/50* (2013.01)
USPC .......................... 370/253; 370/311; 455/343.1

(58) Field of Classification Search
CPC .................... H04W 52/0206; H04W 72/1242; H04W 28/14; H04W 84/12; H04W 88/08
USPC ............ 370/252–336; 455/343.1–343.5, 435, 455/574
See application file for complete search history.

(56) References Cited

U.S. PATENT DOCUMENTS

| | | | |
|---|---|---|---|
| 6,377,790 | B1 | 4/2002 | Ishii |
| 6,545,989 | B1 | 4/2003 | Butler |
| 7,916,675 | B2 | 3/2011 | Dalsgaard et al. |
| 7,941,626 | B2 | 5/2011 | Marinier et al. |

(Continued)

FOREIGN PATENT DOCUMENTS

| | | |
|---|---|---|
| AU | 2004202732 A1 | 7/2004 |
| EP | 1932380 A2 | 6/2008 |

(Continued)

OTHER PUBLICATIONS

Partial International Search Report—PCT/US2013/022226—ISA/EPO—Apr. 18, 2013.

(Continued)

*Primary Examiner* — Afsar M Qureshi
(74) *Attorney, Agent, or Firm* — S. Hossain Beladi (57) ABSTRACT A wireless communications power saving method and apparatus is provided. The method includes establishing a circular buffer configured to maintain a number of most recently encountered frame delay times and waiting a frame delay time after receiving a further frame before the station enters a power save state. Frame delay time is a period equal to a largest most recently encountered frame delay period in the circular buffer. The method further determines, at a station, a dormancy time based on a number of data frames received since the station transitioned from an inactive mode to an active mode, a packet transmission rate, and a data frame time interval representing time between data frames received at the station, and causes the station to switch to a further inactive mode if a next packet is not received within the dormancy time after receipt of a previous packet.

26 Claims, 8 Drawing Sheets

(56) References Cited

U.S. PATENT DOCUMENTS

| | | | |
|---|---|---|---|
| 8,094,595 B2 | 1/2012 | Montojo et al. | |
| 8,098,635 B2 | 1/2012 | Montojo et al. | |
| 8,254,977 B2 | 8/2012 | Fernandez-Corbaton et al. | |
| 2004/0017792 A1 | 1/2004 | Khaleghi et al. | |
| 2005/0237984 A1* | 10/2005 | Benveniste | 370/338 |
| 2006/0105717 A1* | 5/2006 | Kwon et al. | 455/63.1 |
| 2006/0205396 A1 | 9/2006 | Laroia et al. | |
| 2007/0195723 A1 | 8/2007 | Attar et al. | |
| 2007/0263655 A1 | 11/2007 | Esteves et al. | |
| 2009/0092069 A1* | 4/2009 | Rhee | 370/311 |
| 2009/0180414 A1 | 7/2009 | Maeda et al. | |
| 2009/0312060 A1 | 12/2009 | Bloebaum et al. | |
| 2010/0202393 A1 | 8/2010 | Zhang et al. | |
| 2010/0208639 A1 | 8/2010 | Jou et al. | |
| 2010/0214942 A1 | 8/2010 | Du et al. | |
| 2010/0323683 A1 | 12/2010 | Kazmi et al. | |
| 2011/0044221 A1 | 2/2011 | Proctor, Jr. | |
| 2011/0069649 A1 | 3/2011 | Gobriel et al. | |
| 2011/0072285 A1 | 3/2011 | Fischer et al. | |
| 2011/0103301 A1 | 5/2011 | Mueck et al. | |
| 2011/0116427 A1 | 5/2011 | Chang et al. | |
| 2011/0158142 A1 | 6/2011 | Gong et al. | |
| 2011/0170420 A1 | 7/2011 | Xi et al. | |
| 2012/0026939 A1 | 2/2012 | Sindhushayana et al. | |
| 2012/0082079 A1 | 4/2012 | Luo et al. | |
| 2013/0028092 A1 | 1/2013 | Tong et al. | |
| 2013/0107774 A1* | 5/2013 | Wang et al. | 370/311 |
| 2013/0121172 A1 | 5/2013 | Cheng et al. | |
| 2013/0190027 A1 | 7/2013 | Cao et al. | |
| 2013/0215812 A1 | 8/2013 | Hu et al. | |
| 2013/0250832 A1* | 9/2013 | Kim et al. | 370/311 |

FOREIGN PATENT DOCUMENTS

| | | |
|---|---|---|
| EP | 2320692 A1 | 5/2011 |
| EP | 2398285 A1 | 12/2011 |
| GB | 2493713 A | 2/2013 |
| WO | 2007025138 A2 | 3/2007 |
| WO | 2007148198 A2 | 12/2007 |

OTHER PUBLICATIONS

International Search Report and Written Opinion—PCT/US2013/022226—ISA/EPO—May 31, 2013.

* cited by examiner

METHOD AND APPARATUS FOR REDUCING POWER CONSUMPTION IN A WIRELESS COMMUNICATION DEVICE

The present Application for Patent is related to the following U.S. Patent Application:

"Wireless Communication Device Power Reduction Method and Apparatus", U.S. patent application Ser. No. 13/401,122, filed Feb. 21, 2012, assigned to the assignee hereof, and expressly incorporated in its entirety by reference herein.

BACKGROUND

I. Field

The present invention relates generally to telecommunications, and, more specifically, to power savings for wireless devices employed in wireless communication systems and cellular communication systems.

II. Background

A modem communication system provides data transmission for a variety of applications, including voice and data applications. In point-to-multipoint communications, modem communication systems have been based on frequency division multiple access (FDMA), time division multiple access (TDMA), code division multiple access (CDMA), and other multiple access communication schemes.

A CDMA communications system is typically designed to support one or more CDMA standards, such as (1) the "TIA/EIA-95 Mobile Station-Base Station Compatibility Standard for Dual-Mode Wideband Spread Spectrum Cellular System" (this standard with its enhanced revisions A and B may be referred to as the "IS-95 standard"), (2) the "TIA/EIA-98-C Recommended Minimum Standard for Dual-Mode Wideband Spread Spectrum Cellular Mobile Station" (the "IS-98 standard"), (3) the standard sponsored by a consortium named "3rd Generation Partnership Project" (3GPP) and embodied in a set of documents known as the "W-CDMA standard," (4) the standard sponsored by a consortium named "3rd Generation Partnership Project 2" (3GPP2) and embodied in a set of documents including "TR-45.5 Physical Layer Standard for cdma2000 Spread Spectrum Systems," the "C.S0005-A Upper Layer (Layer 3) Signaling Standard for cdma2000 Spread Spectrum Systems," and the "TIA/EIA/IS-856 cdma2000 High Rate Packet Data Air Interface Specification" (the "cdma2000 standard" collectively), (5) the 1xEV-DO standard, and (6) certain other applicable standards. The standards expressly listed above are incorporated by reference as if fully set forth herein, including annexes, appendices, and other attachments.

Generally, a wireless local area network (WLAN) Access Point provides data on the downlink to a user's wireless device, also called a station, or STA. The downlink transmission of large quantities of data from an Access Point to a STA can sometimes result in the STA remaining fully powered for extended periods of time due to uncertainty as to whether all data has been received from the upstream devices. As a result, such devices do not efficiently conserve power in the device.

Different power saving schemes have been devised. Various methods have been employed to address a wireless device transitioning to a power save mode after receiving large blocks of data on the downlink, i.e. from the Access Point. Such methods have included using power save indications on certain transmitted frames, and use of inactivity timers, wherein after a certain amount of inactivity the STA transitions to a power save mode. However, these designs either require additional bandwidth or processing, or employ timers in accordance with assumptions that may be invalid or unduly excessive.

In one available implementation, called PS-Polling, the STA goes into a sleep mode or state. The Access Point indicates the presence of data for the sleeping STA through the Traffic Indication Map (TIM) transmitted using the beacon signal which can be received by the sleeping STA. The STA, upon receiving the TIM indicating the availability of data at the Access Point, exists the sleep state and sends a Null frame with a Power Management "transition to active mode" indication. When the Access Point receives the Power Management transition event from the STA, such a WLAN arrangement has in the past computed a "worst case" delay time, wherein the STA waits for a relatively long amount of time, i.e. more time than is necessary in a worst case scenario, before again entering Power Save mode. Values considered include the amount of time needed to transmit the frame, the amount of delay resulting from channel interference and frame retries, and so forth, resulting in a relatively large inactivity period, i.e. a relatively large amount of time before Power Save again begins at the STA.

Therefore, there is a need for methods and apparatus that would reduce power consumption at the STA without excessively compromising performance characteristics of the STAs and of the radio networks with which the STAs communicate.

SUMMARY

The following presents a simplified summary in order to provide a basic understanding of some aspects of the claimed subject matter. This summary is not an extensive overview, and is not intended to identify key/critical elements or to delineate the scope of the claimed subject matter. Its sole purpose is to present some concepts in a simplified form as a prelude to the more detailed description that is presented later.

Systems and methods are provided for saving power in a terminal operating in a wireless communications system. The method includes establishing a circular buffer configured to maintain a number of most recently encountered frame delay times and waiting for a frame delay time after receiving a further frame before causing the station to enter a power save state. The frame delay time is a period of time equal to a largest most recently encountered frame delay period of time contained in the circular buffer. The method further includes determining, at a station, a dormancy time based on a number of data frames received since the station transitioned from an inactive mode to an active mode, a packet transmission rate, and a data frame time interval representing time between data frames received at the station; and causing the station to switch to a further inactive mode if a next packet is not received within the dormancy time after receipt of a previous packet.

To the accomplishment of the foregoing and related ends, certain illustrative aspects are described herein in connection with the following description and the annexed drawings. These aspects are indicative, however, of but a few of the various ways in which the principles of the claimed subject matter may be employed and the claimed subject matter is intended to include all such aspects and their equivalents. Other advantages and novel features may become apparent from the following detailed description when considered in conjunction with the drawings.

DETAILED DESCRIPTION

In this document, the words "embodiment," "variant," and similar expressions are used to refer to particular apparatus, process, or article of manufacture, and not necessarily to the same apparatus, process, or article of manufacture. Thus, "one embodiment" (or a similar expression) used in one place or context can refer to a particular apparatus, process, or article of manufacture; the same or a similar expression in a different place can refer to a different apparatus, process, or article of manufacture. The expression "alternative embodiment" and similar phrases are used to indicate one of a number of different possible embodiments. The number of possible embodiments is not necessarily limited to two or any other quantity.

The word "exemplary" is used herein to mean "serving as an example, instance, or illustration." Any embodiment or variant described herein as "exemplary" is not necessarily to be construed as preferred or advantageous over other embodiments or variants. All of the embodiments and variants described in this description are exemplary embodiments and variants provided to enable persons skilled in the art to make or use the invention, and not to limit the scope of legal protection afforded the invention, which is defined by the claims and their equivalents.

The word "traffic" generally refers to payload or user traffic, such as data other than air interface control and pilots.

A station, also referred to as STA, subscriber station, user equipment, UE, mobile terminal, or MT, may be mobile or stationary, and may communicate with one or more base transceiver stations. An access terminal may be any of a number of types of devices, including but not limited to PC card, external or internal modem, wireless telephone, smartphone, and personal digital assistant (PDA) with wireless communication capability. A station transmits and receives data packets to or from a radio network controller through one or more base transceiver stations.

Base transceiver stations and base station controllers are parts of a network called radio network, RN, access network, and AN. A radio network may be a UTRAN or UMTS Terrestrial Radio Access Network. The radio network may transport data packets between multiple access terminals. The radio network may be further connected to additional networks outside the radio network, such as a corporate intranet, the Internet, a conventional public switched telephone network (PSTN), or another radio network, and may transport data and voice packets between each access terminal and such outside networks. Depending on conventions and on the specific implementation variants, a base transceiver station may be referred to by other names, such as Node-B, base station system (BSS), or simply base station. Similarly, a base station controller may be referred to by other names, such as radio network controller, RNC, controller, mobile switching center, or serving GPRS support node.

The scope of the invention extends to these and similar wireless communication system components.

The present design seeks to enable the a station (STA) in a wireless local area network (WLAN) communication system to obtain all buffered traffic in an Access Point's queue before transitioning to a Power Save mode, but not waiting for an excessive amount of time before transitioning to Power Save mode. The present design employs a circular buffer at the STA containing the most recent transmission delay times encountered at the STA. The design can, in certain embodiments, employ an inactivity timer together with the circular buffer to decrease the amount of time the STA operates at full power. Using the circular buffer alone or with the inactivity timer, the STA enters Power Save mode more rapidly and can decrease the amount of power used when receiving data on the downlink.

Figure 1:
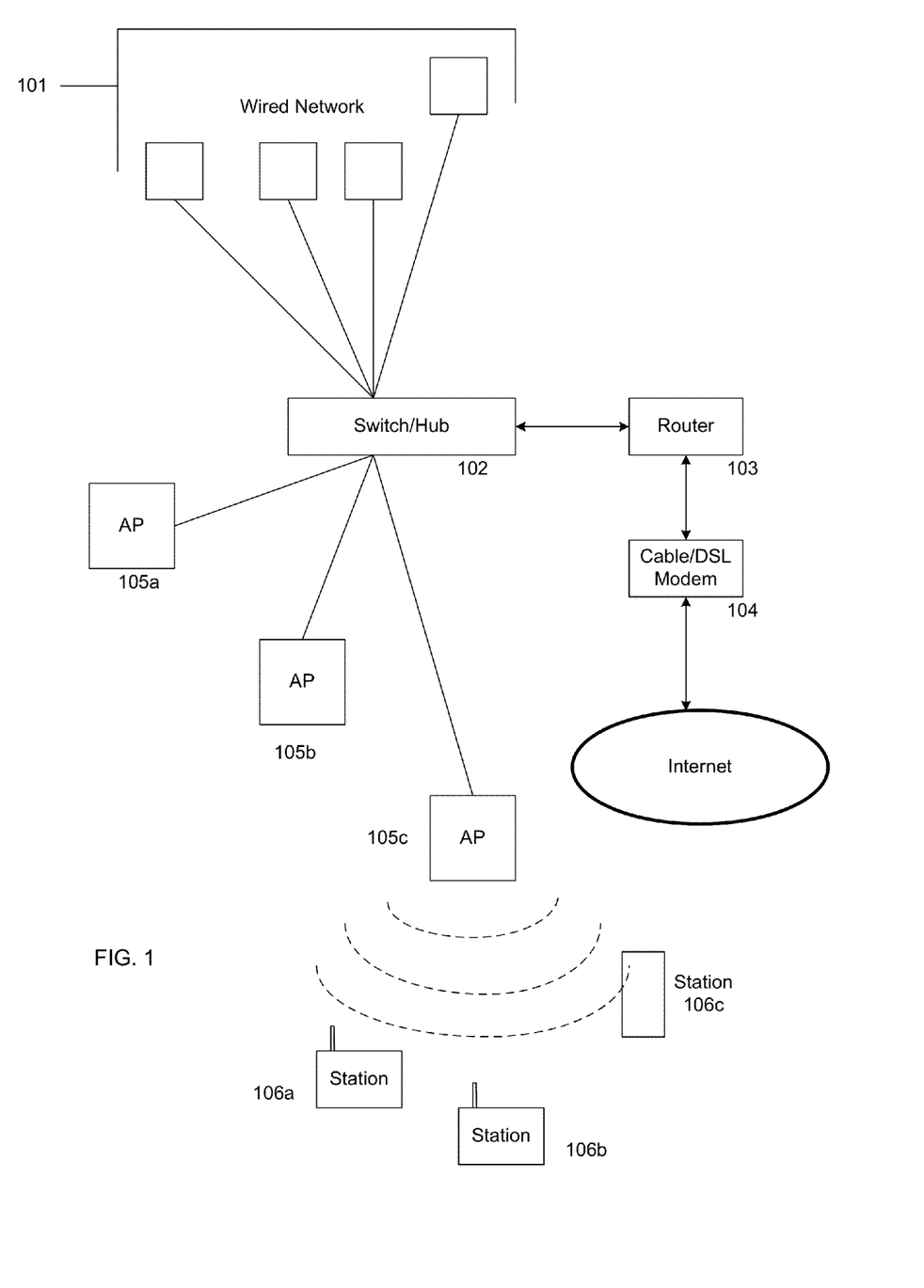
FIG. 1 is a high level block diagram of a system that employs power saving according to the present design.

FIG. 1 illustrates a typical WLAN arrangement including the components of the present design. From FIG. 1, a wired network 101 may be connected to a switch or hub 102. The switch or hub 102 is typically connected to a router 103 and a device such as a cable modem or DSL modem 104, which connects to the internet. Wired connections may be provided from the switch or hub 102 to a number of Access Points, where three are shown in FIG. 1, Access Points 105a, 105b, and 105c. Each Access Point 105a, 105b, and 105c may be accessed by a station or terminal, wherein three such stations or terminals 106a, 106b, and 106c are shown connecting wirelessly to Access Point 105c.

Circular Buffer with First Frame Delay

Figure 2:
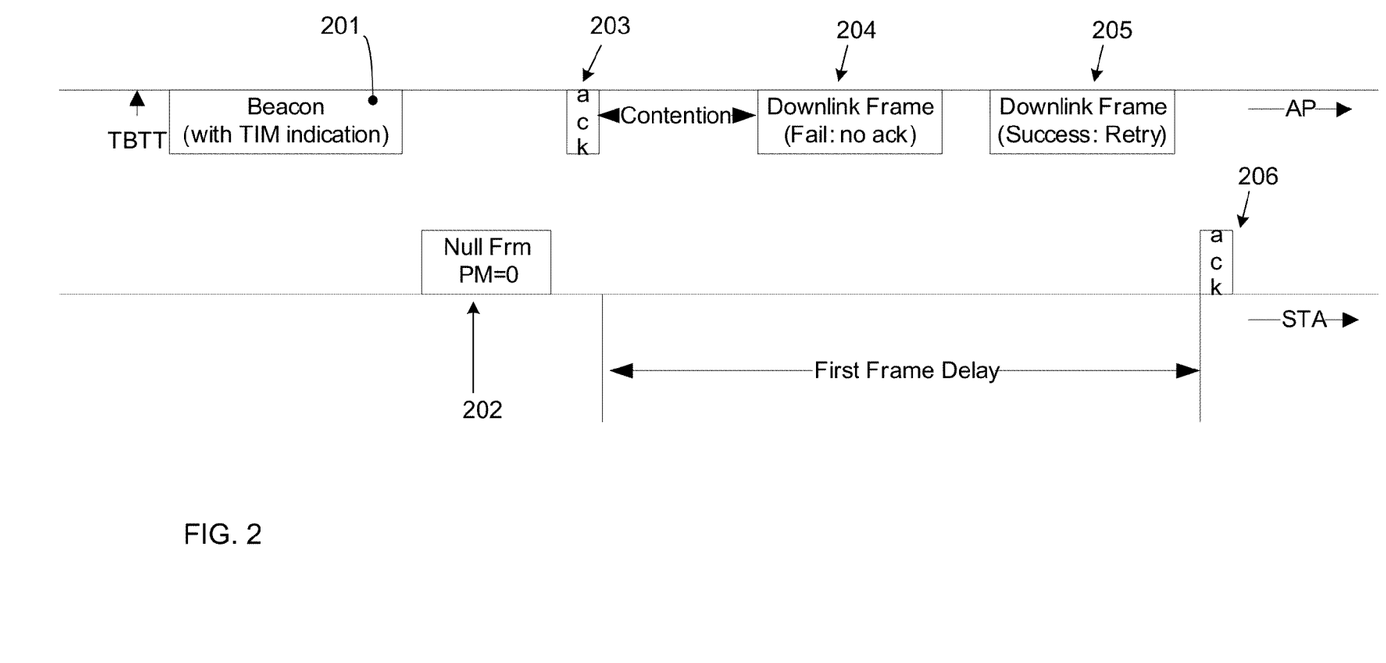
FIG. 2 illustrates a timeline showing operation of the present design and the First Frame Delay.

FIG. 2 illustrates the associated concept of a First Frame Delay, namely the amount of time between acknowledgement of receipt of the Null Frame at the Access Point and acknowledgement by the STA that the first frame has been successfully received. At the end of the First Frame Delay, the STA transitions to a Power Save mode. In this configuration, the First Frame Delay differs from the inactivity period. The First Frame Delay represents the amount of time needed to transmit and successfully receive the first frame, while the inactivity period represents the largest amount of time incurred by the STA in fetching the first frame in the history of N samples.

In FIG. 2, the upper line represents transmissions and activities at the Access Point, while the lower line represents transmissions and activities at the STA. TBTT is the Target Beacon Transmission time, while point 201 represents transmission of the beacon with a Transmission Indication Map (TIM) indication. The STA at point 202 transmits a null frame with Power Management bit off. The AP acknowledges the null frame at point 203, and sends a downlink frame at point 204. In this example, the downlink frame fails, as the AP receives no acknowledgement from the STA. At point 205, the AP retries transmitting the downlink frame, whereupon the STA transmits an acknowledgement at point 206. The First Frame Delay represents the time between acknowledgement transmission 203 by the AP and acknowledgement transmission by the STA.

Figure 3:
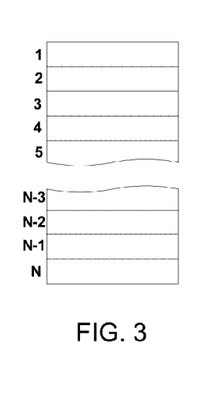
FIG. 3 shows a circular buffer.

One embodiment of the present design collects all of the First Frame Delays in a circular buffer maintained in firmware at the Access Point. The Access Point and STA then uses the largest First Frame Delay previously encountered, with an additional buffer period, as the inactivity period. FIG. 3 illustrates the circular buffer arrangement of this embodiment.

From FIG. 3, the AP firmware maintains the circular buffer 301 with N samples of First Frame Delay.

Figure 4:
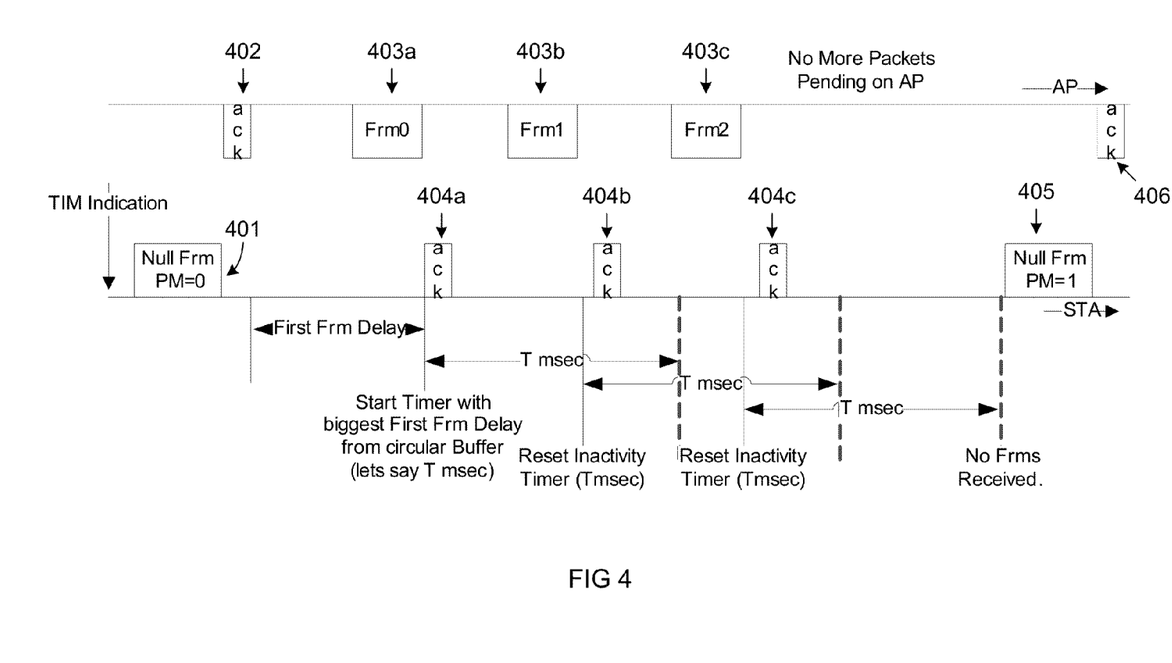
FIG. 4 is a timeline including multiple frame transmission and first frame delay and inactivity timer operation when multiple frames are transmitted.

FIG. 4 illustrates an alternate embodiment of the present design, using the circular buffer concept in a different manner. From FIG. 4, once the STA receives the TIM indication, the STA sends a NULL frame with the Power Management bit clear. Upon receiving the acknowledgement indication from the Access Point of receipt of the NULL frame, the STA determines the time that elapses in receiving the first downlink data frame from the Access Point. The elapsed time represents the First Frame Delay for this iteration of downlink data fetched from the Access Point. This First Frame Delay is recorded as the latest (most recent) entry into the circular buffer. The system selects the largest First Frame Delay in the circular buffer (Tmsec) and uses this value as the inactivity timer for subsequent frames.

As shown in FIG. 4, the firmware in the Access Point initiates a timer of Tmsec upon reception of Frame 0 (the first data frame) and resets the timer every time a frame is received before the expiration of the timer. When the STA receives all the buffered frames from the Access Point, the inactivity timer expires and the STA sends the Null Frame with the Power Management bit set to the Access Point to indicate the station is entering Power Save mode. Thus the embodiment of FIG. 4 uses the circular buffer and an inactivity timer, with the inactivity timer expiring at the time of the largest First Frame Delay in the circular buffer.

FIG. 4 illustrates the TIM indication received by the STA followed by the transmission of the null frame, with Power Management set to zero, at point 401. The Access Point transmits an acknowledgement at point 402, followed by a series of frames 403a, 403b, and 403c representing Frame0, Frame1, and Frame2, respectively. The STA transmits acknowledgements 404a, 404b, 404c after each frame 403a, 403b, and 403c is received. Each of the three frames shown is received at the STA within the T millisecond inactivity timer window, and thus the inactivity timer is reset each time a frame is received. The inactivity timer T milliseconds is set based on the greatest value in the circular buffer. When the inactivity timer expires without having received a packet, the null frame is sent by the STA and the power management bit is set high at point 405. The AP sends an acknowledgement of receiving the null frame at point 406.

Figure 5:
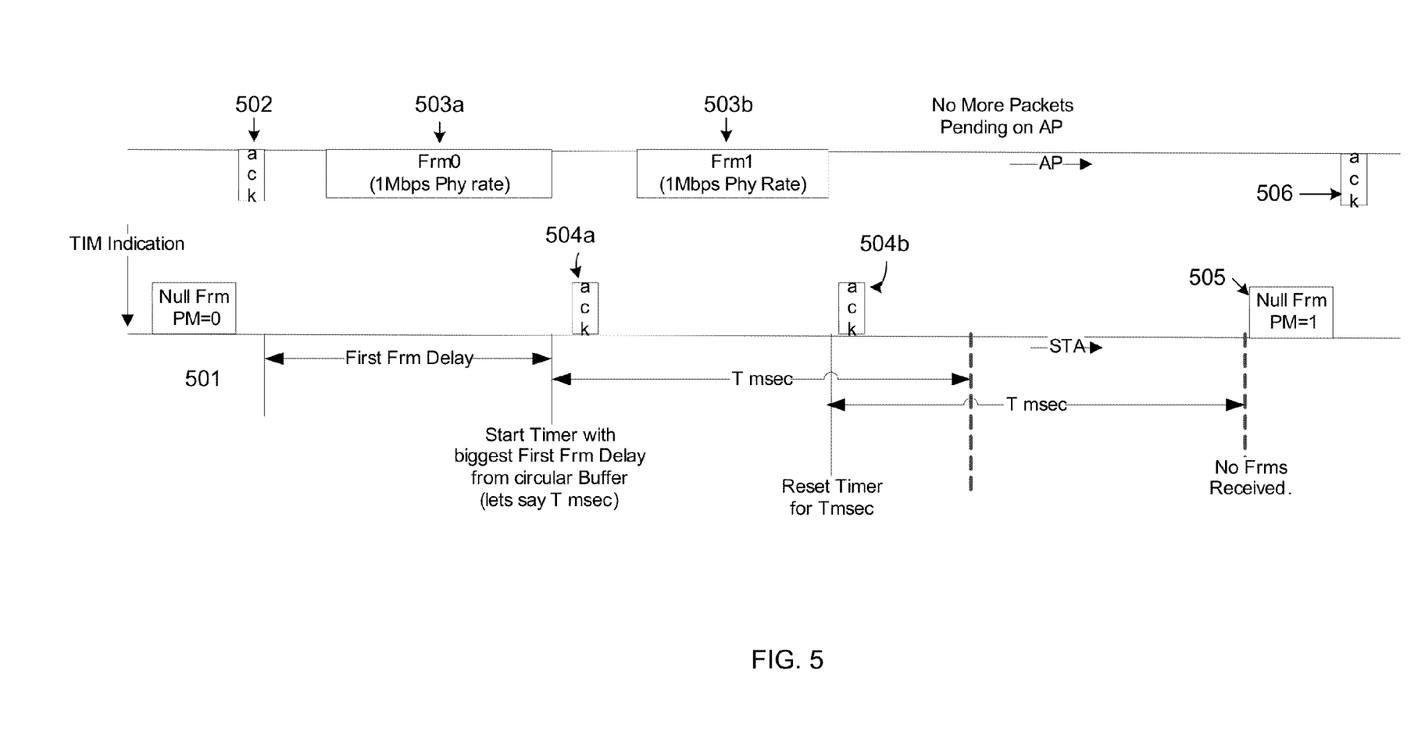
FIG. 5 illustrates a timeline showing use of the First Frame Delay and inactivity timer adapting to a change in the Phy rate.

One additional factor to be considered for power saving is delays in transmission from the STA to the access point. FIG. 5 illustrates the adaptation of the inactivity timer to the physical layer (Phy) rate of the AP, where the Phy rate is the speed at which the STA communicates with the AP. The system monitors the Phy rate for the Access Point and corresponding frame size, and when the Phy rate on the Access Point drops to a low rate due to interference, the system increases the First Frame Delay to accommodate the Phy rate decrease. If the frame size is relatively large and the Phy rate is relatively low, the system increases the First Frame Delay. The values may vary, but for example, if the Phy rate decreases by X per cent, the system may increase the First Frame Delay to X per cent above the largest First Frame Delay in the circular buffer. As a result, the inactivity timer period (Tmsec) increases, seeking to ensure that the STA waits for sufficient time to receive all the buffered frames from the AP even in the presence of interference and low Phy rate.

FIG. 5 illustrates the Phy rate situation. From FIG. 5, the STA provides the TIM indication and null frame 501, and the AP acknowledges at point 502. The AP transmits frame zero 503a, with a 1 Mbps Phy rate in this example, larger than the standard frame size. The STA acknowledges at point 504a. After the First Frame Delay, the inactivity timer commences using the biggest First Frame Delay available in the circular buffer. The AP then transmits frame one 503b, the STA acknowledges at point 504b, and this sequence causes a reset of the inactivity timer. Once no more packets are received from the AP, the inactivity timer expires, and the STA transmits the Null frame 505 with power management bit set high. The AP acknowledges at point 506.

An alternate embodiment to reduce the latency in fetching downlink frames, such as in the case of a local server requiring minimal latency, uses the uplink frame to transition the STA from the Power Save state to the active state. In this embodiment, the system uses both uplink and downlink frames to transition to the Power Save State. The STA uses the largest First Frame Delay from its history (but not the circular buffer) as the inactivity period for both uplink and downlink. In other words, the system resets the inactivity timer on every uplink frame in addition to every downlink frame. The First Frame Delay is not recorded into the circular buffer because the system transitions from Power Save state to Active state based on the uplink frame time rather than based on receipt of the TIM indication from the Access Point.

The circular buffer is not employed in this embodiment because the first frame received after state transition may not be an appropriate frame, e.g. a buffered frame. As a result, the First Frame Delay may be a misleading or incorrect indicator. The system thus does not store the First Frame Delay in the circular buffer and does not employ the circular buffer.

Figure 6:
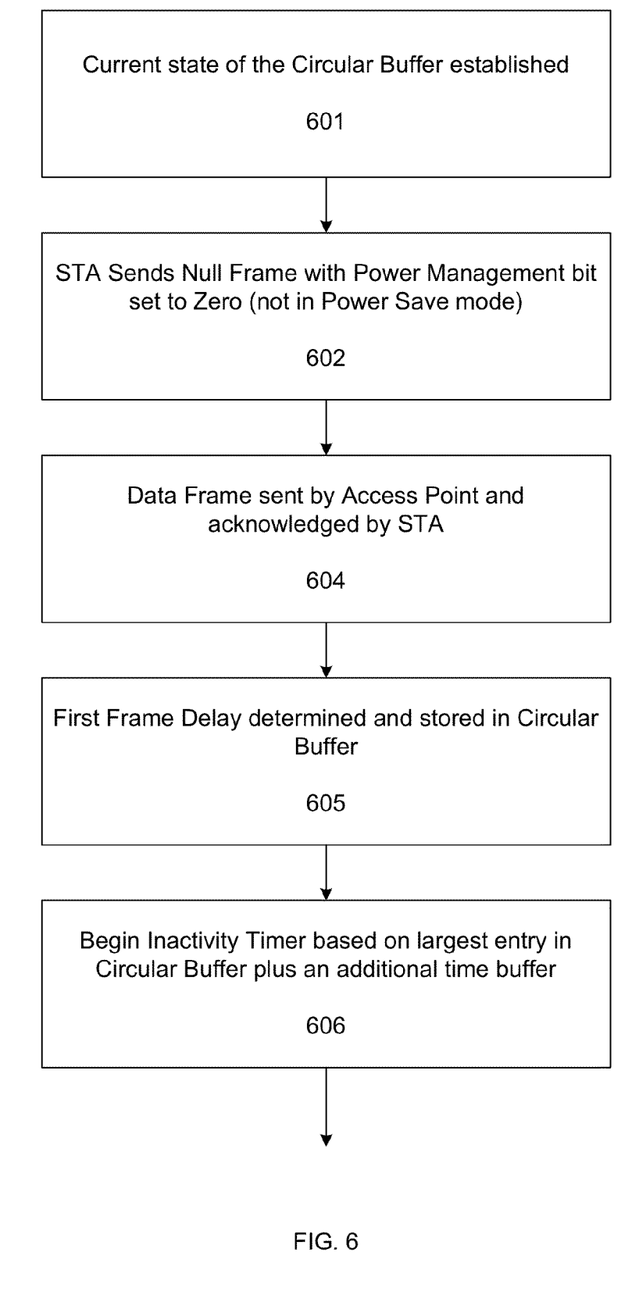
FIG. 6 is a flowchart of operation of one embodiment of the present design.

FIG. 6 is a flowchart summarizing the first (circular buffer only) embodiment. In FIG. 6, the circular buffer is either unset (empty) or may include one or more delay time set points, as previous transmissions may have resulted in the circular buffer containing certain time values. In either case, the circular buffer has a current state at point 601. At point 602, the STA sends the Null Frame with Power Management set to 0, or unset. The Access Point at point 603 sends an acknowledgement to the STA of having received the Null Frame. Point 604 indicates the Access Point sends a data frame and the STA acknowledges the data frame. The First Frame Delay, measuring the time from acknowledgement by the Access Point of receipt of the Null Frame, to acknowledgment of the first frame being received at the STA, is determined and provided to the circular buffer at point 605. In this embodiment, point 606 indicates that the largest value available in the circular buffer is employed with an additional time buffer as the inactivity time. After the inactivity time expires, the STA sends the Null Frame with Power Management set to 1, indicating entry into Power Save mode.

Figure 7:
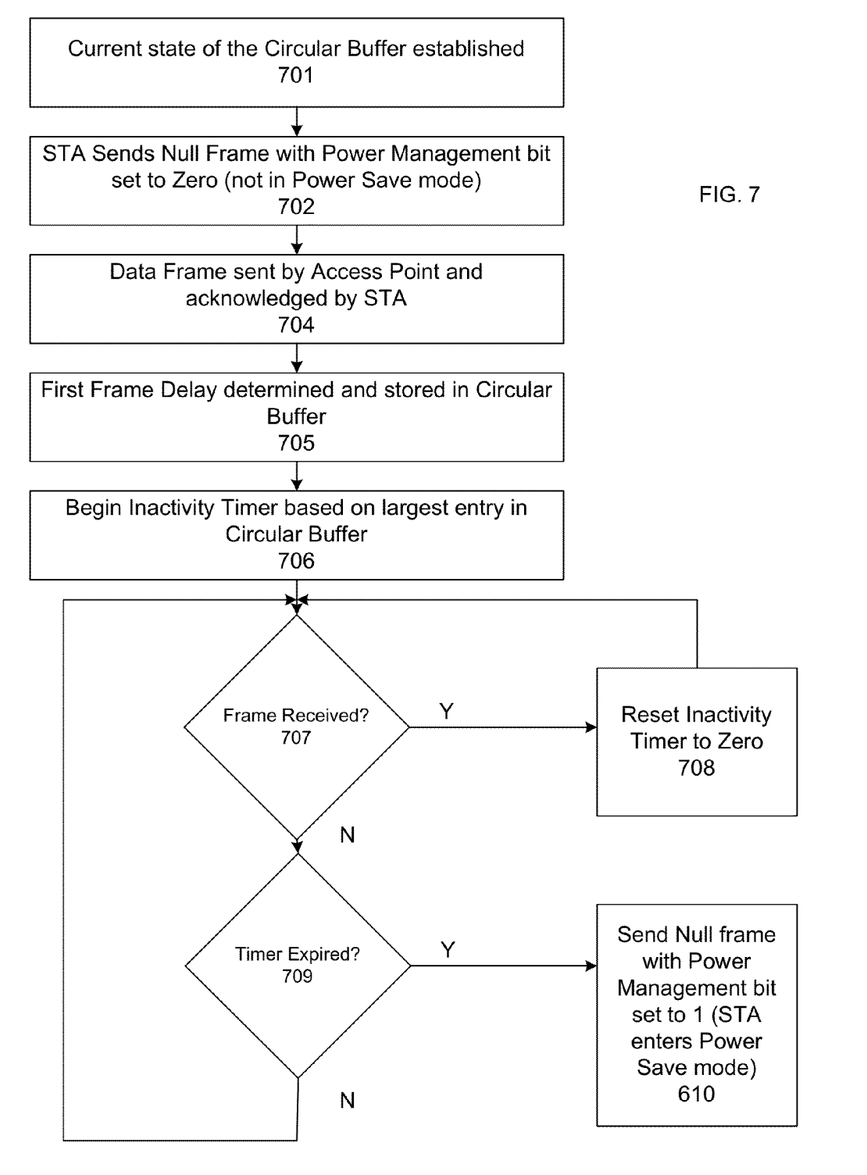
FIG. 7 is a flowchart showing an alternate embodiment of the present design.

FIG. 7 is a flowchart summarizing the circular buffer use with an independent inactivity timer. As with FIG. 6, the circular buffer may initially be unset or empty, or may include one or more inactivity timer set points, and previous transmissions may have resulted in the circular buffer containing certain time values. In any of these situations, the circular buffer has a current state at point 701. At point 702, the STA sends the Null Frame with Power Management set to 0, or unset. The Access Point at point 703 sends an acknowledgement of having received the Null Frame. Point 704 indicates the Access Point sends a data frame to the STA and the STA acknowledges the data frame. The system determines the First Frame Delay, representing the time from acknowledgement by the Access Point of receipt of the Null Frame to acknowledgment of the first frame being received at the STA, and provides this First Frame Delay to the circular buffer at point 705.

Once the STA receives the first frame and acknowledgement sent by the STA, the inactivity timer at the STA starts as shown by point 706. At point 707 the system determines whether another frame has been received at the STA from the Access Point while the inactivity timer is still operating. If another frame has been received, the system resets the inactivity timer to zero at point 708 and processing returns to point 707. If no other frame is received, operation progresses to point 709, wherein the system determines whether the inactivity timer has expired. If so, the STA sends a Null Frame with Power Management set, i.e. equal to 1, at point 710, indicating entry into Power Save mode. If the inactivity timer has not expired and no other frame received, processing loops back to await either receipt of an additional message and/or expiration of the timer.

Thus according to the present design, there is provided a method for saving power in a wireless communication system comprising a station and an access point. The method comprises establishing a circular buffer at the station, the circular buffer configured to maintain a number of most recently encountered frame delay times representing times between the access point transmitting one frame of data and the station receiving the one frame of data, and waiting for a frame delay time after receiving a further frame, and if no additional frame of data is received within the frame delay time, causing the station to enter a power save state. In this embodiment, the frame delay time is a period of time equal to a largest most recently encountered frame delay period of time contained in the circular buffer.

Dynamic Inactivity Computation

In most scenarios, the rate an Access Point can serve Stations is much higher than the rate of traffic arriving at the Access Point. An alternate embodiment duty cycles a STA connection with an Access Point as follows. The STA initially turns off its modem. Once the STA turns off its modem, or enters the sleep or power save state, the Access Point buffers the subsequent packets, or holds the packets without transmitting the packets, until the STA turns its modem back on.

The decision as to when to turn off the STA modem in the midst of active traffic does not depend on a fixed parameter in this embodiment. The present embodiment adapts to the estimated inter-packet arrival time and the service interval, where the service interval is the amount of time needed to process the transmission. One implementation uses the ratio of time that the STA stays active during the last interval, i.e. the time from the last beacon transmission, to the number of data packets received during that period of time.

The present algorithm runs only when the STA is in the active mode. Upon entering the active mode, the STA initializes the dormancy timer DT to a maximum value, DTmax. When in active mode, the system operates as follows when a new frame is received. First, the system determines k, the number of data frames received since the STA switched to active mode. The system then calculates E, an estimate of how rapidly packets arrive at an Access Point, also called a source interval:

$$E = E_k/k \quad (1)$$

where $E_k$ is the time that has elapsed since the Station last entered a power saving mode to the time the kth data frame is received. The system initially sets a value M to zero, where M represents an estimate of the fastest rate at which the Access Point transmits packets.

The system updates M as follows:

$$M = \max(M, tj) \quad (2)$$

where tj is the interval between the (j-1)th and jth frames. The system then sets:

$$DT = \min(DTmax, (w*M + (1-w)*E)) \quad (3)$$

where w is a configured constant.

The STA then switches to power save mode if the next packet is not received within DT amount of time, where DT is as computed in Equation (3). When reverse link transmissions from the Access Point to the STA occur while the STA is in a sleep state, the STA wakes up and transmits the packets as soon as possible. The STA returns to sleep mode after a wait no longer than DT. The DT value of Equation (3) is not be reset by reverse link transmissions.

Figure 8:
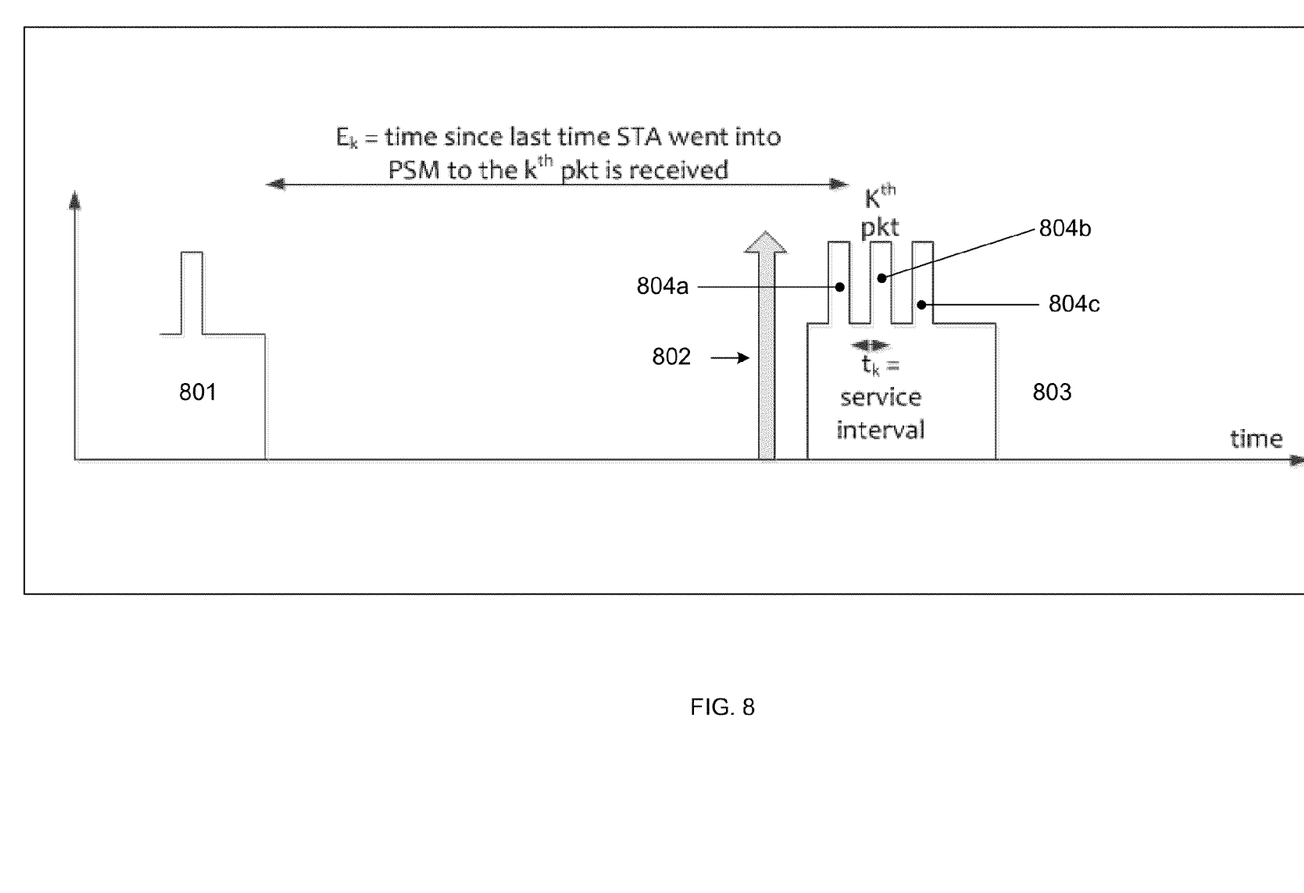
FIG. 8 illustrates an alternate embodiment including a typical transmission waveform and associated beacon.

FIG. 8 illustrates the general waveforms encountered and the parameters determined at the STA. FIG. 8 illustrates preceding waveform 801, followed by beacon 802 and packet 803. Packet 803 includes a base power level, constantly transmitted during the packet, having a plurality of frames provided therewith, shown as frames 804*a*, 804*b*, and 804*c*. Number of frames and power levels may vary. As shown, the service interval $t_k$ represents the period between frames. The time $E_k$ shown represents the time since the STA last entered power save mode to the time the $k^{th}$ packet is received.

Figure 9:
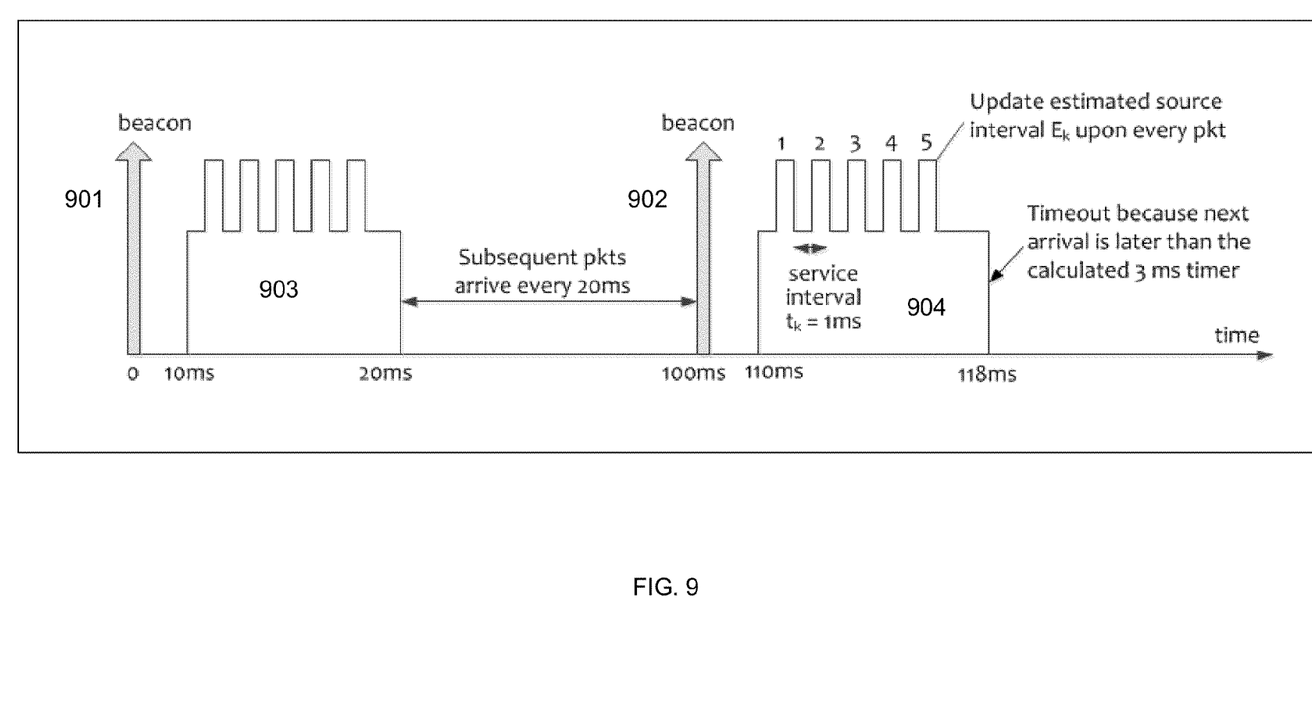
FIG. 9 shows operation according to the alternate embodiment and the values employed in determining the inactivity time.

FIG. 9 illustrates an example of operation of the present embodiment. The values calculated above are illustrated generally in FIG. 9. FIG. 9 includes two beacons 901 and 902 and shows the typical transmission waveform discussed in further detail below. In the example presented in FIG. 9, the two beacon signals 901 and 902 are transmitted 100 milliseconds apart and the waveform shown arrives at the STA every 20 milliseconds. These values may vary depending on circumstances. The transmitted packet, such as packet 903, includes a level of power that is constantly available during the transmission, i.e. a floor power value for the transmission. Each packet transmitted in this example includes five frames, numbered 1-5 in packet 904. The service interval, $t_j$ in Equation (2) above, is the period from the start of one pulse to the start of the next pulse, i.e. pulse number 2 to pulse number 3 in packet 904, representing the rate at which the Access Point transmits packets. If DT in the FIG. 9 configuration is X milliseconds as determined by Equation (3) above, a failure to receive another packet X milliseconds after the packet is expected results in the STA entering sleep mode.

It should specifically be noted that while certain relationships between timing schemes, numbers of pulses, pulse amplitudes and durations, timing gaps, delays, and so forth are reflected herein, the design is not so limiting. For example, different timing and/or power schemes may be employed while still within the scope of the present invention, and the design is not intended to be limited with respect to timing sequences or other variable values provided.

Thus with respect to the current embodiment, the design includes determining, at the station, a dormancy time based on a number of data frames received since the station transitioned from an inactive mode to an active mode, a packet transmission rate, and a data frame time interval representing time between data frames received at the station, and causing the station to switch to a further inactive mode if a next packet is not received within the dormancy time after receipt of a previous packet.

Aspects of the claimed subject matter may be implemented as a method, apparatus, or article of manufacture using standard programming and/or engineering techniques to produce software, firmware, hardware, or any combination thereof to control a computer or computing components to implement various aspects of the claimed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving voice mail or in accessing a network such as a cellular network. Of course, those skilled in the art will recognize many modifications may be made to this configuration without departing from the scope or spirit of what is described herein.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method for saving power in a wireless communication system comprising a station and an access point, the method comprising:
    establishing a circular buffer at the station, the circular buffer configured to maintain a number of most recently encountered frame delay times representing times between the access point transmitting one frame of data and the station receiving the one frame of data; and
    waiting for a frame delay time after receiving a further frame, and if no additional frame of data is received within the frame delay time, causing the station to enter a power save state;
    wherein the frame delay time is a period of time equal to a largest most recently encountered frame delay period of time contained in the circular buffer.

2. The method of claim 1, further comprising altering the frame delay time based on a physical layer transmission rate of the access point.

3. The method of claim 1, wherein the frame delay time includes an additional time buffer margin.

4. The method of claim 1, wherein the circular buffer is initially populated with at least one delay time.

5. The method of claim 1, further comprising resetting the frame delay time to zero when one additional frame of data is received within the frame delay time.

6. The method of claim 1, further comprising transmitting a null frame with a power save indication from the station to the access point to indicate the station is entering the power save state.

7. A station configured for use in a wireless communications network, comprising:
    a processor configured to establish a circular buffer, the circular buffer configured to maintain a number of most recently encountered frame delay times representing times between an access point transmitting one frame of data and the station receiving the one frame of data; and
    a receiver configured to receive data transmitted from the access point;
    wherein the processor is configured to wait for a frame delay time after receiving a further frame, and if no additional frame of data is received within the frame delay time, cause the station to enter a power save state;
    wherein the frame delay time is a period of time equal to a largest most recently encountered frame delay period of time contained in the circular buffer.

8. The station of claim 7, wherein the processor is further configured to alter the frame delay time based on a physical layer transmission rate of the access point.

9. The station of claim 7, wherein the frame delay time includes an additional time buffer margin.

10. The station of claim 7, wherein the circular buffer is initially populated with at least one delay time.

11. The station of claim 7, wherein the processor is further configured to reset the frame delay time to zero when one additional frame of data is received within the frame delay time.

12. The station of claim 7, wherein the terminal comprises a transmitter, and the terminal transmits a null frame with a power save indication from the transmitter to the access point to indicate the station is entering the power save state.

13. A station configured for use in a wireless communications network, comprising:
   means for establishing a circular buffer at the station, the circular buffer configured to maintain a number of most recently encountered frame delay times representing times between an access point transmitting one frame of data and the station receiving the one frame of data; and
   means for waiting for a frame delay time after receiving a further frame, and if no additional frame of data is received within the frame delay time, causing the station to enter a power save state;
   wherein the frame delay time is a period of time equal to a largest most recently encountered frame delay period of time contained in the circular buffer.

14. The station of claim 13, further comprising means for altering the frame delay time based on a physical layer transmission rate of the access point.

15. The station of claim 13, wherein the frame delay time includes an additional time buffer.

16. The station of claim 13, wherein the circular buffer is initially populated with at least one delay time.

17. The station of claim 13, further comprising means for resetting the frame delay time to zero when one additional frame of data is received within the frame delay time.

18. The station of claim 13, further comprising means for transmitting a null frame with a power save indication from the station to the access point to indicate the station is entering the power save state.

19. A non-transitory computer readable storage medium comprising instructions that, when executed by a processor, performs the following method:
   establishing a circular buffer at a station, the circular buffer configured to maintain a number of most recently encountered frame delay times representing times between an access point transmitting one frame of data and the station receiving the one frame of data; and
   waiting for a frame delay time after receiving a further frame, and if no additional frame of data is received within the frame delay time, causing the station to enter a power save state;
   wherein the frame delay time is a period of time equal to a largest most recently encountered frame delay period of time contained in the circular buffer.

20. The non-transitory computer readable storage medium of claim 19, wherein the method further comprises altering the frame delay time based on a physical layer transmission rate of the access point.

21. The non-transitory computer readable storage medium of claim 19, wherein the frame delay time includes an additional time buffer.

22. The non-transitory computer readable storage medium of claim 19, wherein the circular buffer is initially populated with at least one delay time.

23. The non-transitory computer readable storage medium of claim 19, wherein the method further comprises resetting the frame delay time to zero when one additional frame of data is received within the frame delay time.

24. The non-transitory computer readable storage medium of claim 19, wherein the method further comprises transmitting a null frame with a power save indication from the station to the access point to indicate the station is entering the power save state.

25. A method for saving power in a wireless communication system comprising a station and an access point, the method comprising:
   establishing a circular buffer at the station, the circular buffer configured to maintain a number of most recently encountered time values for the access point to transmit and the station to receive a first frame;
   providing the circular buffer with at least one time for the access point to transmit and the receiving station to receive one frame; and
   waiting for a first frame delay and at least one inactivity period comprising the largest amount of time in the circular buffer before causing the station to enter a power save state;
   wherein the station resets the inactivity period whenever a new frame is received from the access point.

26. The method of claim 25, further comprising altering the inactivity period based on a physical layer rate of the transmitting station.

* * * * *